United States Patent [19]
Pittman

[11] Patent Number: 5,244,119
[45] Date of Patent: Sep. 14, 1993

[54] APPARATUS FOR MONITORING DISPENSED FLUID

[76] Inventor: Phillip D. Pittman, 48071 Ben Franklin, Utica, Mich. 48315

[21] Appl. No.: 909,594

[22] Filed: Jul. 7, 1992

[51] Int. Cl.⁵ .............................................. B67D 5/06
[52] U.S. Cl. ..................................... 222/25; 222/641
[58] Field of Search ..................... 222/23, 26, 36, 45, 222/46, 48, 639-641

[56] References Cited

U.S. PATENT DOCUMENTS

| | | |
|---|---|---|
| D. 316,208 | 4/1991 | Griffiths et al. |
| 3,467,279 | 9/1969 | Upton et al. ........................ 222/641 |
| 3,668,479 | 6/1972 | Weston et al. ..................... 222/641 |
| 3,965,337 | 6/1976 | Young . |
| 4,811,862 | 3/1989 | Rutty et al. |
| 4,979,641 | 12/1990 | Turner . |
| 4,997,012 | 3/1991 | Kuziw . |

*Primary Examiner*—Jesus D. Sotelo
*Attorney, Agent, or Firm*—Brooks & Kushman

[57] ABSTRACT

A device for monitoring fluid flow through a beverage dispensing unit with a tap has a switch located behind the tap and a liquid crystal display counter electrically connected to and actuated by the switch. During beverage dispensing, the tap is moved away from the switch, actuating the counter. Closing the tap causes the tap to contact the switch and stop the counter. A housing encases the device so that the device can be easily moved from one dispensing location to another.

8 Claims, 1 Drawing Sheet

APPARATUS FOR MONITORING DISPENSED FLUID

TECHNICAL FIELD

This invention relates generally to devices which monitor fluid flow, and more particularly to a device which monitors the amount of a beverage dispensed through a beverage dispensing unit.

BACKGROUND ART

Many bars and restaurants currently offer draft beer and other beverages to their customers. A number of customers prefer draft beer instead of bottled beer; however, it is difficult for bar owners and managers to make sure that the amount of draft beer dispensed is equal to the amount actually sold. Large amounts of draft beer are wasted or otherwise unaccounted for through sloppy pouring by bartenders, premature opening of taps before a container is in position to be filled, and giving away of draft beer by bar staff.

Several types of devices have been developed to monitor the amount of beverage flowing through a dispensing unit. For example, U.S. Pat. No. 4,979,641 to Turner discloses a computerized beverage dispensing system having a valve and a computerized controller connected to the tap. The beverage flows from the tap into the monitoring device wherein the flow is either restricted or permitted by the valve. The controller is programmed by the operator to open the valve for a certain length of time when the tap is opened to dispense a predetermined amount of beverage.

Similarly, U.S. Pat. No. 3,965,337 to Young describes a monitor in which the amount of beer dispensed is indicated in terms of the sales price. Beverage dispensing is controlled by a pair of pulsers which operate at different rates associated with the dispensing of a glass or a pitcher of beer. The glass-rate pulser is actuated when the dispensing tap is initially opened. If the tap remains open for a period of time greater than that required to fill a glass, the pitcher-rate pulser is automatically actuated.

These types of draft beer monitors require the operator to preprogram into the monitor the amount of beer to be dispensed. Devices of this type often require fluid flow through the device for measurement of flow velocity or pressure. This requirement makes the monitoring unit relatively difficult to install onto the dispensing unit. Additionally, monitors of this type may interfere with the flow of beer through the tap.

SUMMARY OF THE INVENTION

It is therefore an object of the present invention to provide an apparatus which monitors the amount of fluid dispensed through a dispensing unit without requiring the operator to preprogram a monitoring device.

Another object of the present invention is to provide an apparatus which monitors the amount of fluid dispensed through a dispensing unit without interfering with the fluid flow through the tap.

Yet another object of the present invention is to provide an apparatus for monitoring dispensed fluid which can be easily moved and removed from one dispensing unit to another.

Still another object of the present invention is to provide an apparatus for monitoring dispensed fluid which does not require the fluid to flow through the apparatus itself.

Still another object of the present invention is to provide an apparatus for monitoring dispensed fluid which is a compact, self-contained unit that fits directly onto the dispensing unit.

Still another object of the present invention is to provide an apparatus for monitoring dispensed fluid which does not require an outside source of power.

According to the present invention, an apparatus for monitoring the amount of a beverage dispensed through a dispensing unit comprises a switch and a counter which displays a reading corresponding to the amount of the beverage dispensed through the dispensing unit. A tap on the dispensing unit can be moved between an open position and a closed position, thereby allowing or restricting fluid flow, respectively. During the time the tap is in the closed position, it contacts the switch and prevents the counter from incrementing. When the tap is opened and fluid is dispensed, the switch is released and activates the counter until the tap is returned to the closed position. The reading on the counter can then be compared with the unit sales of the beverage to determine if excessive beverage was wasted during dispensing.

Additional objects, advantages and novel features of the invention will become apparent to those skilled in the art upon examination of the description and drawings which follow, or upon practice of the invention.

DETAILED DESCRIPTION OF THE PREFERRED EMBODIMENT

Figure 1:
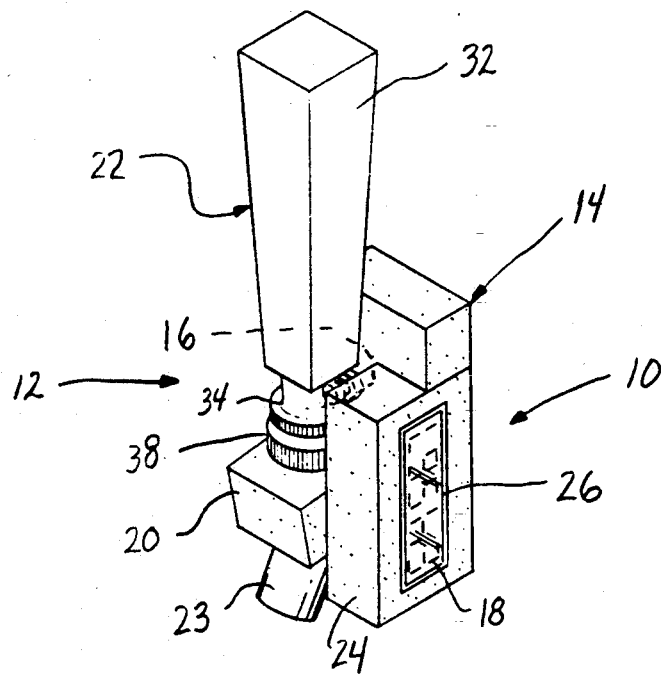
FIG. 1 is a perspective view of a fluid monitoring apparatus according to the present invention in conjunction with a tap on a dispensing unit.

FIG. 1 shows an apparatus 10 for monitoring the amount of a beverage dispensed through a dispensing unit 12. The apparatus 10 comprises a housing 14 on which is mounted a switch 16, and a counter 18. A mounting base 20 is formed on the lower portion of the housing. The mounting base 20 fits onto the dispensing unit 12 so as to position a tap 22 in contact with the switch 16 while the tap 22 is in a closed position where no beverage flows through a spout 23.

A counter box 24 which encases the counter 18 is formed on a side portion of the housing 14. The counter box 24 has a rectangular opening 26 through which the counter 18 can be easily read by an operator such as a bar or restaurant manager. The counter 18 is preferably a liquid crystal-type display (LCD) counter, but it should be understood that any other type of counter which can display a reading indicating either the time the tap 22 is open or the volume of beverage dispensed is acceptable.

Figure 2:
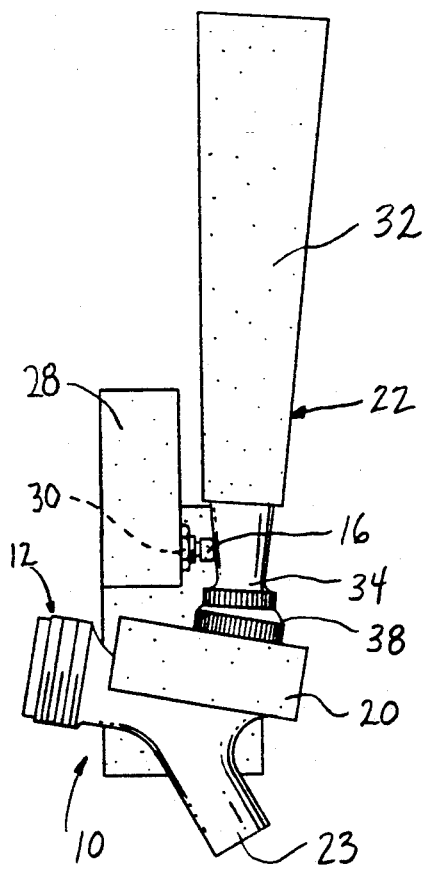
FIG. 2 is a side view of the fluid monitoring apparatus with the tap in a closed position.

Referring to FIG. 2, the dispensing unit 12 and apparatus 10 are shown with the tap 22 in the closed, non-dispensing position. A switch box 28 is located in a rear portion of the housing 14 behind the tap 22. The switch 16 protrudes through a hole 30 in the switch box 28 and is movable within the hole 30. The switch 16 is electrically connected with the counter 18 so that the counter 18 increments when the switch 16 is released, and maintains a constant reading when the switch 16 is depressed or otherwise in contact with the tap 22. When the tap 22 is closed by the operator, the tap 22 contacts the switch 16 and depresses it, thereby preventing the counter 18 from incrementing when fluid is not flowing through the dispensing unit 12. A power supply (not shown), such as a 3-volt lithium battery, may also be located in the switch box 28 to supply electrical power to the LCD counter 18.

Figure 3:
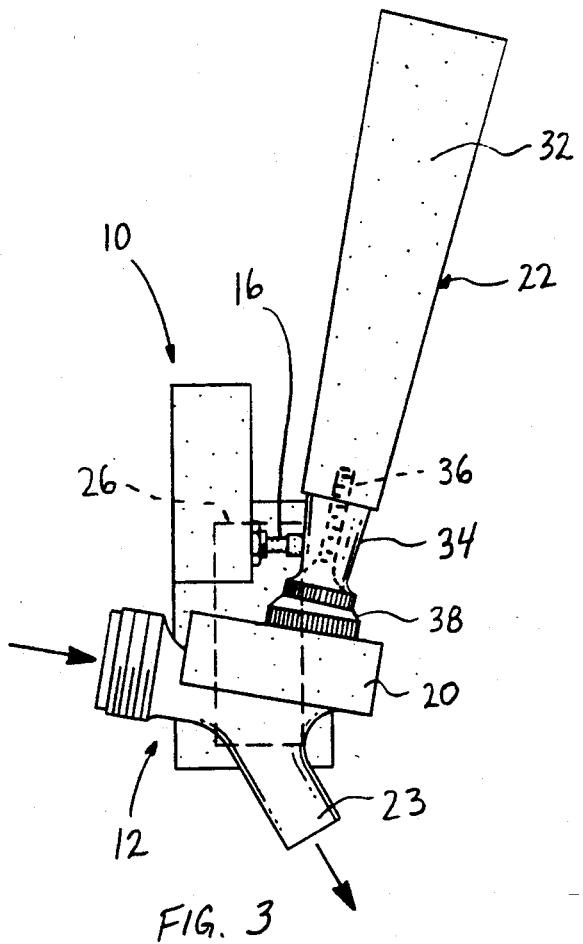
FIG. 3 is a side view of the fluid monitoring apparatus with the tap in an open position.

During dispensing of a beverage, the tap 22 is moved to an open position as shown in FIG. 3. The direction of fluid flow through the dispensing unit 12 is also shown by the arrows. When the tap 22 is in the open position, the switch 16 is released and the counter 18 begins to increment at a constant rate. The counter 18 continues to increment until the tap 22 is returned to the closed position to stop fluid flow, thereby contacting the switch 16 and stopping the counter 18. If the counter reading indicates the time the tap 22 is open, an operator can monitor the changes in the counter reading and use a look-up table or other guide to convert the counter reading to a volume measurement. This volume measurement, indicating the amount of beverage dispensed, can then be compared to the amount of beverage sold.

The apparatus 10 is easily removed from the dispensing unit 12 as follows. First, a handle portion 32 and a neck portion 34 of the tap 22 are unscrewed from the threaded stem 36 of a shoulder portion 38 of the dispensing unit 12. The shoulder portion 38 is then likewise unscrewed from the dispensing unit 12. Thereafter, the mounting base 20 can be lifted off the spout 23, and the entire apparatus 10 removed to another location. If the mounting base 20 is alternatively bolted or otherwise fastened to the dispensing unit 12, the mounting base 20 is, of course, first detached and then removed, but in any event the process is performed relatively quickly and easily.

The preceding description of the illustrated embodiment of the invention is intended to describe the best mode of practicing the invention. It will be readily appreciated by one of ordinary skill in the art that certain modifications and improvements may be made to the disclosed embodiment without departing from the spirit and scope of the present invention. The present invention should be measured by the following claims.

What is claimed is:

1. A fluid monitoring apparatus easily installable on and removable from the spout of a dispensing unit having a movable valve stem for opening and closing said spout and an installable and removable handle means for moving said valve stem, said apparatus comprising,
    a housing having a controllable counter portion, a mounting portion and a switch portion arranged in a unitary side-by-side relationship,
    said switch portion having a switch actuator engageable for controlling said counter portion,
    said mounting portion being configured for mounting over said spout and for receiving said valve stem therethrough while being mounted, the configuration of said mounting portion with respect to said spout positioning said counter portion beside said spout and the switch actuator beside said handle means when said mounting portion is mounted over said spout and said handle means is moving said valve stem,
    said handle means being installable on said valve stem after said mounting portion is mounted over said spout to hold said housing on said spout and to position said handle means in engageable relationship with said switch actuator.

2. The fluid monitoring apparatus of claim 1 wherein said counter portion includes a display.

3. The fluid monitoring apparatus of claim 1 wherein each portion of said housing is a box-like structure and said mounting portion and said switch portion are affixed to said counter portion and sufficiently spaced from each other to cooperate in the positioning of said handle means in engageable relationship with said switch actuator.

4. The fluid monitoring apparatus of claim 3 wherein said mounting portion straddles said spout and cooperates with the spacing of said mounting portion and said switch portion in the positioning of said handle means in engageable relationship with said switch actuator.

5. The fluid monitoring apparatus of claim 1 wherein said handle means comprises a first fastener cooperable with said valve stem and said mounting portion for holding the housing on said spout and a second fastener cooperable with said valve stem for positioning said handle means into engageable relationship with said switch actuator.

6. The fluid monitoring apparatus of claim 5 wherein said second fastener includes a shoulder in interfacing relationship with said first fastener when said valve stem moves.

7. The fluid monitoring apparatus of claim 5 wherein said valve stem is threaded and said first and second fasteners are nuts threadably cooperating with said valve stem.

8. In combination with a fluid dispensing unit having a spout and a movable valve stem for opening and closing said spout for controlling the flow of fluid from said spout, a fluid monitoring apparatus easily and quickly installable on and removable from the spouts of different dispensing units, and an installable and removable handle means for moving said valve stem and for holding said apparatus on a selected one of said different dispensing units, said apparatus comprising,
    a housing having a controllable counter portion including a digital display, a mounting portion and a switch portion arranged in a compact unitary side-by-side relationship for fitting directly onto said selected dispensing unit,
    said switch portion having a switch actuator engageable for controlling the digital display of said counter portion,
    said mounting portion being configured for mounting over the spout of said selected dispensing unit and for receiving said valve stem therethrough while being mounted, the configuration of said mounting portion with respect to said spout positioning said counter portion beside said spout so that said display is visible at said dispensing unit and positioning the switch actuator to the rear of said handle means when said mounting portion is mounted over said spout and said handle means is moving said valve stem so that the handle means may be positioned to engage said switch actuator,
    said handle means being installable on said valve stem after said mounting portion is mounted over said spout to hold said housing stationary on said spout and to position said handle means in engageable relationship with said switch actuator,
    said handle means including fastener means removable from said valve stem for releasing the hold of said housing on said spout so that said apparatus can be quickly removed from the spout of said selected dispensing unit.

* * * * *